Jan. 3, 1933.  G. W. CRABTREE  1,893,229
VEHICLE SPRING CLIP
Filed March 5, 1931
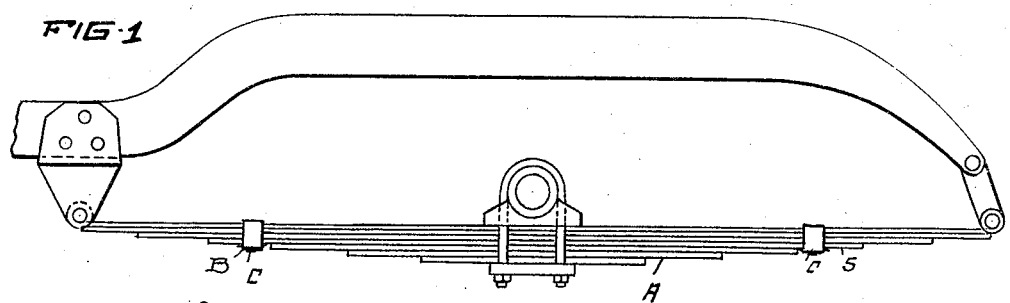
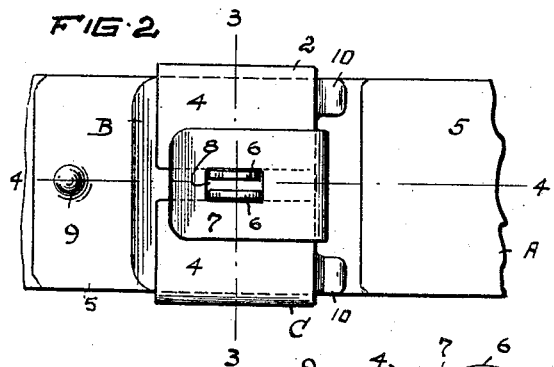
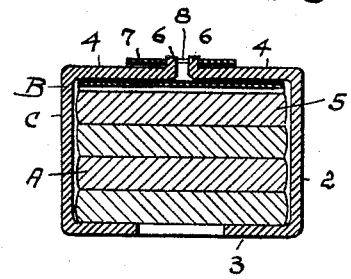
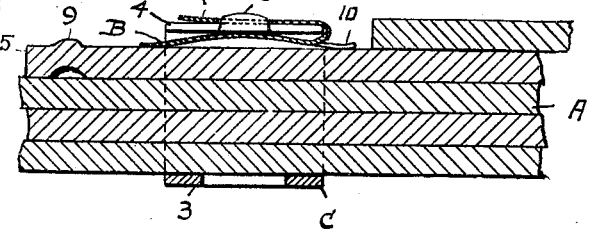
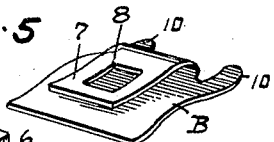
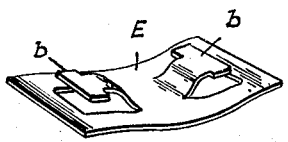
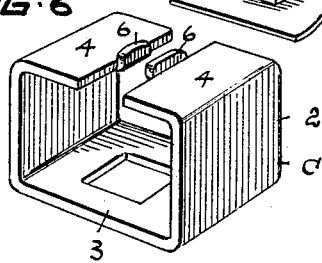
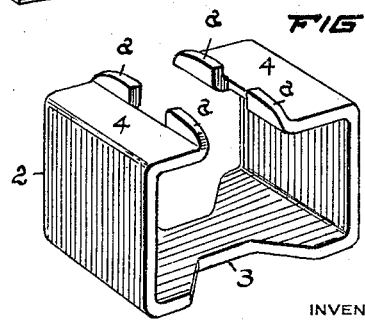
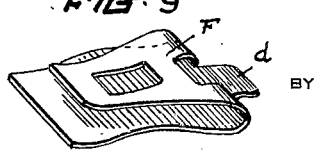
INVENTOR
GEORGE W. CRABTREE
BY
Fisher, Moser + Moore
ATTORNEY Patented Jan. 3, 1933

1,893,229

UNITED STATES PATENT OFFICE

GEORGE W. CRABTREE, OF CLEVELAND HEIGHTS, OHIO

VEHICLE SPRING CLIP

Application filed March 5, 1931. Serial No. 520,281.

My invention relates to an improvement in detachable clips for leaf springs, and in general my object is to provide a clip which is particularly constructed to be easily attached to a laminated vehicle spring and also readily removed therefrom, and which when affixed to the spring leaves will hold the same firmly against spreading or fanning. The clip includes a spring locking member to maintain it under spring tension, to prevent looseness and rattle, and to take up wear. The clip body is foldable and the locking device reenforces and secures the clip against unfolding when these parts are secured together in place upon the vehicle spring, although made and fashioned to permit separation and removal thereof simply and expeditiously when the clip itself is to be detached from the vehicle spring, all as hereinafter shown and described and as exemplified in the accompanying drawing, in which Fig. 1 is a side elevation of a vehicle spring equipped with a pair of clips made according to my invention. Fig. 2 is an enlarged view of the clip mounted upon an inverted portion of a vehicle spring. Fig. 3 is a cross sectional view of the clip and spring on line 3—3 of Fig. 2, and Fig. 4 is a longitudinal section on line 4—4 of Fig. 2. Figs. 5 and 6 are perspective views of the locking member and clip respectively. Figs. 7 and 8 are perspective views of a modified form of locking device, and clip, respectively. Fig. 9 is a perspective view of a modified form of locking device for the clip shown in Fig. 6.

Vehicle springs of the leaf or laminated type are customarily provided with metal clips to prevent separation and lateral spreading of the superposed leaves, and these clips are commonly riveted or fixed in some suitable way to one of the leaves, and therefore, not readily removable and replaceable. The present clip is expressly made to permit convenient attachment and detachment, and is an improvement on the clip shown and described in my application for patent, filed on the 10th day of October, 1930, Ser. No. 487,655. Thus, the body 2 of the present clip C is of the same rectangular shape as the angular box clip referred to, and made narrower in part in its connecting portion 3 and divided in part to permit it to be readily buckled and folded around a laminated vehicle spring A. When sleeved over the vehicle spring, the divided parts or inturned flanges 4—4 of the clip are brought together and folded down upon an outer leaf 5 of the spring but with a slight space or gap between such parts. A loose fit is thus permitted in installing the present device, to accommodate slight variations in width and thickness of the spring leaves inasmuch as similar springs differ very often in those respects. However provision is made to lock the clip under spring tension when affixed to the vehicle spring so that such variation and wear will be compensated for and rattle and chatter prevented.

To faster such and other objects the present clip has the inner or opposed edges of its inturned ends or flanged portions 4—4 provided with corresponding relatively short lips 6—6 which project outwardly in parallel relation and are preferably slightly rounded at their outer edges. When the clip is folded over the spring leaves these lips 6—6 are brought closely together, and the flanges or end portions 4—4 are spaced apart from the outer leaf 5 of the spring where they overlap it, thereby permitting a thin spring-steel locking plate B to be inserted in this space. Plate B includes a spring tongue 7 having an opening 8 therein adapted to receive the locking lips 6—6 of clip C when this plate is slipped into place.

The main body or base portion of the spring-locking plate or clip B is cambered or curved so that when inserted into the space between the box clip and the vehicle spring it will flatten out more or less and act as a tension spring between said parts and also cause the slotted spring tongue to bear down upon the flanges or divided wall of the box clip with spring locking effect. The tongue itself is flexible and possesses inherent spring properties to permit it to ride over the rounded projections or lips on the box clip and to effect a locking connection with said projections or lips when the slot or opening in the tongue registers therewith in slipping the locking plate or clip into locking position. One function of the spring plate is to take up or compensate for a loose fit between the box clip and the vehicle spring and to prevent noise and rattle, and another important function of this plate is to lock the split or divided portions or flanges of the box clip firmly together so that the clip will not open up or unfold under lateral spreading or fanning movements of the spring leaves. On the other hand, it is necessary at times in repairing the vehicle spring to remove the box clips, and in that case a prying instrument can be inserted under the free end of the locking tongue to lift it apart from the locking lips on the box clip, thereby permitting these parts to be readily separated. The box clip can then be opened or unfolded and removed from the vehicle spring.

To prevent the box clip from backing off or working itself free from its locking position on the vehicle spring, the leaf upon which the spring locking plate or clip is seated may be formed with an indentation or protuberance 9 which will serve as a stop detent for the locking plate and box clip. However, this stop or detent is not absolutely necessary if the seating portion of the locking plate or clip is constructed to produce more friction or to press with greater force against the vehicle spring at the open end of the spring locking plate or clip. For example, the spring locking clip B shown in Figs. 1 to 6 is provided at its reverted end with a pair of short spring seats or bearing extensions 10, and the opposite or free end of the main body or base portion of this locking clip is straight and of greater seating area or nearly as wide as the vehicle spring itself so that when the vehicle spring is flexed in use the tendency of the spring locking clip is to shift in the direction of the line of least resistance toward its reverted end and in the direction of the thicker central portion of the vehicle spring or a higher superposed leaf instead of in the opposite direction toward a lower leaf or the graduated thinner end of the vehicle spring.

In Figs. 7 and 8 I show a modified form of the invention, comprising a divided box spring D having a set of notched locking lips —a— adapted to receive a pair of T-shaped locking tongues —b— extending in opposite directions from a curved or cambered spring plate —E—, and in Fig. 9 a further modified form of spring locking plate —F— is delineated which is provided with a single extension —d— formed centrally in the reverted or double end edge of the plate.

What I claim, is:

1. A box clip for laminated vehicle springs, having a divided main body, and a cambered spring plate adapted to be interposed between said body and vehicle spring, said body and plate having co-operating interlocking means for locking the divided portions of said main body separably together and holding same in anti-rattling connection with said vehicle spring.

2. A box clip for laminated vehicle springs, having a divided body, and a plate having a spring tongue for locking the divided portions disconnectibly together.

3. A box clip for laminated vehicle springs, having a freely-bendable wall portion and divided extremities, and a spring plate seated within said box clip having means for locking said divided extremities together.

4. A box clip for laminated vehicle springs, having a freely-bendable connecting wall and divided extremities, a cambered spring plate spanning the inner sides of said divided extremities, and means for locking said divided extremities against unfolding movements.

5. A box clip for laminated vehicle springs, having a divided body and a connecting wall of reduced cross section to permit folding of the clip medially thereof, and a separate spring plate in spanning and locking connection with the divided portions of said body.

6. A box clip for laminated vehicle springs, having a divided body formed with a freely-bendable wall medially thereof, and a cambered spring plate having a flexible tongue for connecting the divided portions of said body together.

7. A box clip for laminated vehicle springs, having a divided body formed with locking projections, and a cambered spring plate adapted to be interposed between said box clip and vehicle spring, said plate having a locking tongue adapted to overlap the divided portions of said body.

8. A box clip for laminated vehicle springs, having a divided body, and a spring plate adapted to be interposed between said clip and spring having a reverted locking tongue adapted to embrace and lock the divided portions of said body together.

9. A box clip for laminated vehicle springs, having a divided body, and a spring locking plate for said divided body having bearing portions of unequal area at opposite ends thereof to seat upon the vehicle spring.

10. A box clip for laminated vehicle springs, having a divided body, and a spring plate having a reverted locking tongue for the divided portions of said body and spring bearing extensions adapted to seat upon said vehicle spring.

11. A box clip for laminated vehicle springs, having a divided wall formed with rounded locking projections, and a spring plate adapted to be interposed between said wall and the vehicle spring having a flexible locking tongue formed with an opening to receive said locking projections.

12. A foldable box clip for laminated vehicle springs, having divided extremities, each formed with a locking projection, in combination with a flat spring member having an opening therein to receive both locking projections and prevent unfoldment of said clip under fanning movements of the laminations, and said flat spring member having pressure engaging contact with said clip to hold it frictionally under tension against one of the laminated leaves of said vehicle springs.

In testimony whereof I affix my signature.

GEORGE W. CRABTREE.